United States Patent [19]
Kitagawa

[11] Patent Number: 5,898,234
[45] Date of Patent: Apr. 27, 1999

[54] POWER SUPPLY UNIT WITH SIMPLIFIED CIRCUITRY

[75] Inventor: Seiya Kitagawa, Kawasaki, Japan

[73] Assignee: Fujitsu Limited, Kawasaki, Japan

[21] Appl. No.: 08/760,096

[22] Filed: Dec. 3, 1996

[30] Foreign Application Priority Data

May 31, 1996 [JP] Japan .................................... 8-137814

[51] Int. Cl.⁶ ..................................................... H02J 3/32
[52] U.S. Cl. ............................................. 307/48; 320/128
[58] Field of Search .................................. 307/48, 43, 46,
307/64–66, 85–87; 320/2, 5, 9, 10, 11,
51, 53, 127, 128, 132, 134, 136, 137; 395/750,
750.01, 750.03, 750.06, 750.08; 364/492,
207, 268, 268.3

[56] References Cited

U.S. PATENT DOCUMENTS

| 4,400,625 | 8/1983 | Hussey ........................................ 307/66 |
| 5,200,644 | 4/1993 | Kobayashi et al. ......................... 307/66 |
| 5,218,288 | 6/1993 | Mickal et al. .............................. 307/66 |

FOREIGN PATENT DOCUMENTS

| 0 019 932 | 12/1980 | European Pat. Off. . |
| 0 546 872 | 6/1993 | European Pat. Off. . |
| 0 665 628 | 8/1995 | European Pat. Off. . |
| 0 731 545 | 9/1996 | European Pat. Off. . |
| 1 472 465 | 5/1977 | United Kingdom . |
| 2 061 642 | 5/1981 | United Kingdom . |
| 2 219 449 | 12/1989 | United Kingdom . |
| 2 233 172 | 1/1991 | United Kingdom . |
| 2 292 845 | 3/1996 | United Kingdom . |
| 2 298 326 | 8/1996 | United Kingdom . |
| 80/02478 | 11/1980 | WIPO . |
| 90/16105 | 12/1990 | WIPO . |

Primary Examiner—Richard T. Elms
Attorney, Agent, or Firm—Staas & Halsey

[57] ABSTRACT

A power supply unit includes a charger composed of a switch for enabling and disabling a charge current and a charge control unit for controlling the switch in accordance with the charge current, the switch being provided in a path shared by the charge current and a discharge current and including a power feed status detection unit for detecting a normal supply voltage of an external power supply source, an absence of a supply of a voltage from the external power supply source, and a drop in a voltage supplied by the external power supply source, and the charge control unit controlling charging of the electric battery by controlling the switch while the power feed status detection unit detects the normal supply voltage of the external power supply source, closing the switch when the power feed status detection unit detects an absence of a supply of a voltage from the external power supply source or a drop in a voltage supplied by the external power supply source, so as to form a discharge path connecting the electric battery and a load, thus supplying power from the electric battery to the load via the switch.

5 Claims, 11 Drawing Sheets

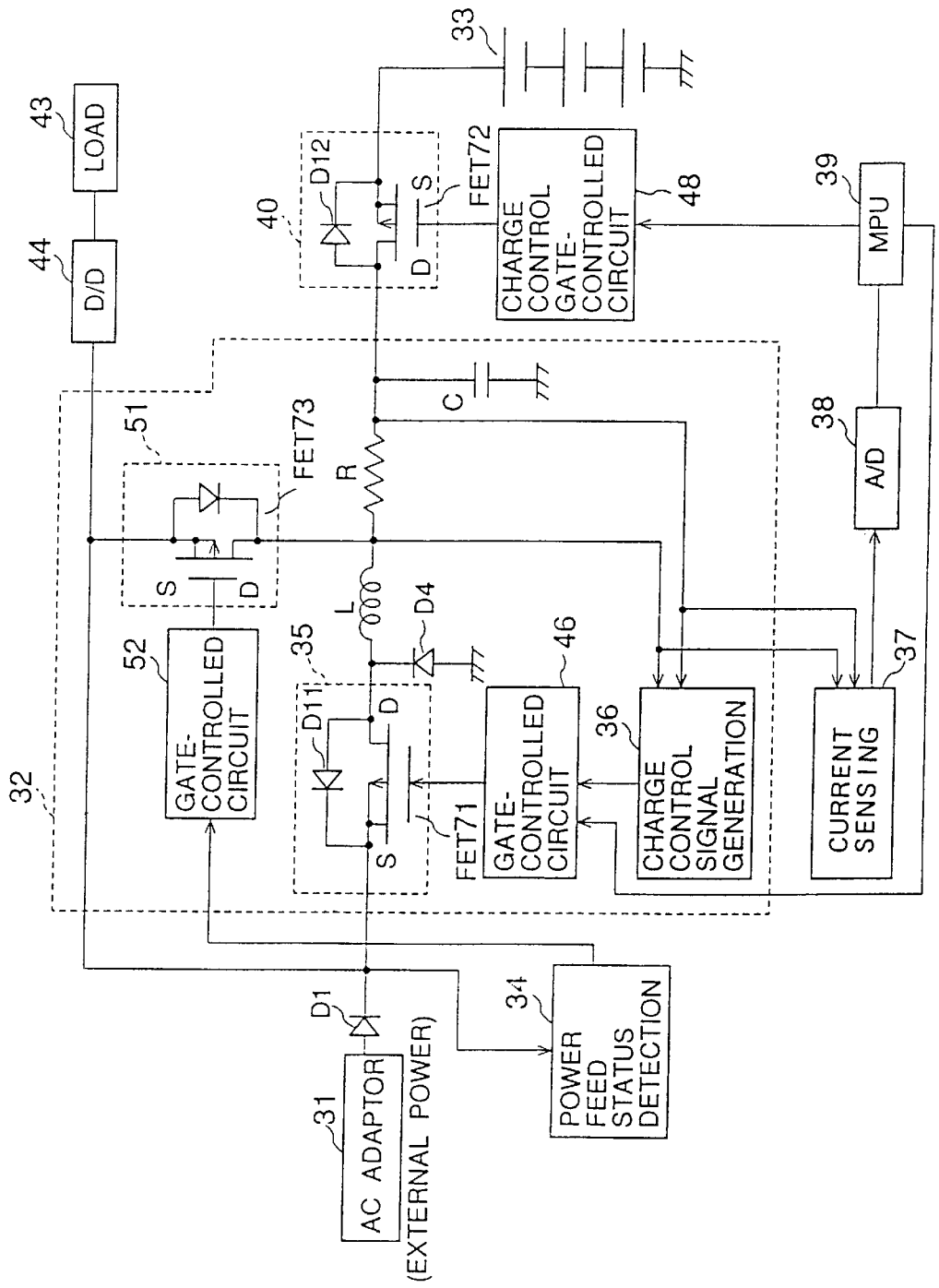

POWER SUPPLY UNIT WITH SIMPLIFIED CIRCUITRY

BACKGROUND OF THE INVENTION

1. Field of the Invention

The present invention generally relates to power supply units and, more particularly, to a power supply unit for an appliance carrying electric batteries.

Appliances such as a notebook personal computer carrying an electric battery are usually operable using an AC adaptor for converting a commercial AC power into a DC power or the electric battery carried in the appliance. Also, such an appliance is usually equipped with a charger so that the electric battery is charged while the AC adaptor is being used.

2. Description of the Related Art

FIG. 1 shows a construction of a conventional power supply unit.

Referring to FIG. 1, the power supply unit comprises an AC adaptor 111, an electric battery 112, a charger 113, a current sense circuit 114, an D/D converter 115, an A/D converter 117, a microprocessor 118, a discharge control circuit 119 and butt diodes D1–D3.

The AC adaptor 111 provides, under normal conditions, a higher voltage than the electric battery 112 implemented by, for example, a lithium battery.

The charger 113 charges the electric battery 112 with power supplied by the AC adaptor 111.

The current sense circuit 114 detects a charge current and a discharge current of the electric battery 112.

The D/D converter 115 converts the output voltage of the AC adaptor 111 or the electric battery 112 to a voltage adapted for a load 116.

The A/D converter 117 converts an analog current sensed by the current sense circuit 114 into a digital value.

The microprocessor 118 controls the charge level and the discharge level of the electric battery 112.

The discharge control circuit 119 controls the discharge level of the electric battery 112.

The butt diode D1 prevents the power of the electric battery 112 from being drained to the AC adaptor 111 while the electric battery 112 is in use.

The butt diode D2 prevents the power of the electric battery 112 from being drained to the charger 113 while the electric battery 112 is in use.

The butt diode D3 prevents the power of the AC adaptor 111 from being drained to the current sense circuit 114.

A description will now be given of the operation according to the construction in FIG. 1.

When the AC adaptor is in use, the power thereof is fed to the D/D converter 115 via the diode D1. The D/D converter generates a voltage adapted for the load 116 from the power supplied thereto. As described above, the diode D3 prevents the power supplied by the AC adaptor 111 from being drained to current sense circuit 114.

The power of the AC adaptor is also supplied to the charger 113 which is in control of the charging. The charge current is fed to the input of the current sense circuit 114 via the diode D2. The charge power is transmitted from the current sense circuit 114 to the electric battery 112. An analog current sensed by the current sense circuit 114 is fed to the A/D converter 117. The A/D converter 117 converts the analog current into a digital value and notifies the MPU 118 of the level of the digital current. The MPU 118 calculates the charge level based on the current output from the A/D converter 117. Upon detecting an overcharge, the MPU 118 notifies the charger 113 of the overcharge.

A description will now be given of an operation in which the power is supplied from the electric battery 112 to the load 116.

When the AC adaptor 111 fails, the cathode voltage of the D1 and D3 drops to a level lower than the voltage of the electric battery 112, causing the power of the electric battery 112 to be fed to the load 116 (hereinafter, we will refer to a state in which the AC adaptor 111 is disconnected in the power supply unit and a state in which the output voltage thereof drops to an abnormally low level, usually below the voltage of the electric battery, as a power failure).

The power of the electric battery 112 is subject to the discharge control effected by the discharge control circuit 119 and then fed to the D/D converter 15 via the current sense circuit 114 and the diode D3. The D/D converter 115 then generates a voltage adapted for the load 116 from the voltage supplied thereto. As described before, the diode D2 prevents the power supplied from the electric battery 112 from being drained to the charger 113, and the diode D1 prevents the power from the electric battery 112 from being drained to the AC adaptor 111.

The current sense circuit 114 detects the discharge current of the electric battery 112 and supplies the detected analog current level to the A/D converter 117. The A/D converter 117 converts the analog current level into a digital value and transmits the same to the MPU 118. The MPU 118 monitors the discharge current on the basis of the digital value of the discharge current generated by the A/D converter 117. In the event that an overdischarge occurs, the MPU 118 notifies the discharge control circuit 119 accordingly. The discharge control circuit 119 controls the discharge by, for example, stopping the discharge in response to an associated instruction from the MPU 118.

FIG. 2 shows a construction of a conventional charger. FIG. 2 specifically shows a construction for constant-voltage/constant-current charging required of a lithium battery.

Referring to FIG. 2, a charger 113 comprises a flyback circuit formed of a coil L, a resistor R, a capacitor C and a diode D4; a switch circuit 121; a gate-controlled circuit 122; and a charge control signal generation unit 120. The charge control signal generation unit 120 includes a PWM comparator 123, error amplifiers 124 and 125 and an oscillator 126.

The switch circuit 121 turns an input voltage Vin from the AC adaptor ON and OFF so as to control an output voltage Vout of the charger 113.

The gate-controlled circuit 122 controls the ON/OFF action of the switch circuit 121.

The PWM comparator 123 receives the outputs of the error amplifiers 124 and 125, and compares the received outputs with a reference voltage provided by the oscillator 126 so as to generate a control signal to control the operation of the gate-controlled circuit 122.

The error amplifier 124 detects the level of the current output from the charger 113 by receiving the voltage generated across a current sense resistor R.

The amplifier 125 detects the output voltage Vout.

The oscillator 126 generates the reference voltage for the PWM comparator 123.

The flyback circuit formed of the coil L, the resistor R, the capacitor C and the diode D4 produces an oscillating current from the input voltage Vin which is turned ON and OFF by the switch circuit 121. The oscillating current is rectified by the diode D4, producing a DC output voltage.

A description will now be given of the characteristic of the operation of the charger 113.

FIGS. 3A and 3B show relationships between the inputs of the PWM comparator 123 and the output thereof, the inputs of the PWM comparator 123 being the voltages supplied by the error amplifiers 124 and 125, and the oscillator 126.

The oscillator 126 feeds a voltage having a saw-tooth waveform as shown in FIGS. 3A and 3B to the PWM comparator 123. The PWM comparator 123 compares the output voltages of the error amplifiers 124 and 125 with the saw-tooth voltage. While the saw-tooth voltage is higher in level than the higher one of the voltage of the error amplifier 124 and the voltage of the amplifier 125 voltage, the PWM comparator 123 outputs a signal for turning the gate-controlled circuit 122 ON. For example, referring to FIG. 3A, in case the voltage of the amplifier 125 is higher than the voltage of the error amplifier 124, the PWM comparator 123 outputs a signal for turning the gate-controlled circuit 122 ON while the saw-tooth voltage is higher than the voltage of the amplifier 125 (constant-voltage control). Referring to FIG. 3B, in case the voltage of the error amplifier 124 is higher than the voltage of the amplifier 125, the PWM comparator 123 outputs a signal for turning the amplifier 122 ON while the output voltage of the error amplifier 124 is higher than the saw-tooth voltage (constant-current control).

FIG. 3C shows a relationship between the output current and the output voltage of the charger 113. When the output current is lower than a predetermined level Ia, the charger 113 outputs a constant voltage Va (constant-voltage operation). When the output current reaches the predetermined level Ia, the charger 113 outputs the constant current Ia (constant-current operation).

While the charger 113 shown in FIG. 2 is adapted for constant-current/constant-voltage operation, the charger 113 may be adapted for constant-current operation in the case of a NiCd battery, a NiMH battery or the like where constant-current charging is performed. In such a case, the amplifier 125 for detecting the charge voltage is not necessary. The PWM comparator 123 is only required to compare the output of the error amplifier 124 for detecting the charge current with the output of the oscillator 126.

A description will now be given of the operation of the conventional charger shown in FIG. 2.

The input voltage Vin supplied by the AC adaptor is turned ON and OFF by the switch circuit 121. The transient current flows through the coil L, the resistor R, the capacitor C and the diode D4 so as to generate the output voltage Vout. The relationship between the output voltage Vout and the input voltage Vin is $$Vout = Ton \times Vin / Ts$$

Ton: an ON-state interval while the switch in the switch circuit 121 is turned ON.

Ts: an ON-OFF action period of the switch circuit

Accordingly, the longer the ON-state interval of the switch, and the shorter the ON-OFF action period, the higher the output voltage Vout.

As described before, the error amplifier 124 detects the level of the current output from the charger 113 by receiving the voltage generated across the current sense resistor R. The amplifier 125 detects the output voltage Vout by comparing the voltage input thereto with a reference voltage. The PWM comparator 123 compares the outputs of the error amplifiers 124 and 125 with the oscillation voltage of the oscillator 126.

The PWM comparator 123 produces a signal for turning the gate-controlled circuit 122 ON and a signal for turning the gate-controlled circuit 122 OFF in accordance with the condition illustrated in FIGS. 3A and 3B. In response to the signal output from the PWM comparator 123, the gate-controlled circuit 122 turns the switch circuit 121 ON and OFF. In case the voltage output from the amplifier 125 is higher than that of the error amplifier 124, constant-voltage control is performed such that the switching takes place depending only on the output voltage variation of the amplifier 125. In this way, the output voltage of the charger is maintained at the constant level of Va. In case the voltage output from the error amplifier 124 is higher than that of the amplifier 125, constant-current control is performed such that the switching takes place depending only on the output of voltage variation of the error amplifier 124. In this way, the output current of the charger is maintained at the constant level of Ia.

FIG. 4A shows a construction of the conventional current sense circuit. FIG. 4B shows the characteristic of a current flowing in a current sense resistor versus an output voltage of the current sense circuit.

Referring to FIG. 4A, the current sense circuit 114 comprises operational amplifiers 131, 132 and 133; a resistor R' provided for detection of the discharge current or the charge current; resistors r1, r2, r3, r4, r5, r6 and r7; a butt diode D1 coupled to the AC adaptor; and a butt diode D3 connected to the D/D converter 115.

Given that r2=r3, r4=r5 and r6=r7 in the construction of FIG. 4A, the current Is flowing in the resistor R' and the output voltage Voin are related to each other according to the following equation.

$$Voin = (r7/r4) * (1 + (2r2/r1)) * R' * Is + Vref$$

Accordingly, the characteristic of the current Is flowing in the resistor R' versus the output voltage Voin is as shown in FIG. 4B. The level and direction of the current Is can be determined by detecting the output voltage Voin, the direction of the current Is being dependent on whether the charge current or the discharge current flows in the current sense resistor R'.

The conventional power supply unit requires that the butt diodes D1, D2 and D3 be coupled to the AC adaptor, the charger, and the D/D converter, respectively. Such an arrangement gives rise to a high cost and a large area required to mount the power supply unit.

The conventional power supply unit also requires two current sense resistors, that is, the current sense resistor R in the charger R and the resistor R' in the current sense circuit, the resistor R detecting the charge current and the resistor R' detecting the charge current and the discharge current. For precise detection of the current level, the resistors R and R' must have a relatively large size, thus increasing the area and cost required for mounting. It is also to be noted that the resistors are best eliminated because they consume power without producing any use.

SUMMARY OF THE INVENTION

Accordingly, an object of the present invention is to provide a power supply circuit in which the aforementioned problems are eliminated.

Another and more specific object of the present invention is to provide a low-cost power supply circuit in which the number of butt diodes and current sense resistors is reduced, the area required for mounting is reduced, and the power consumption in the wasteful manner is reduced.

The aforementioned objects of the present invention can be achieved by a power supply unit comprising: an external power supply source; an electric battery; and a charger for charging the electric battery with power from the external power supply source; the charger being formed of a switch for enabling and disabling a charge current and a charge control unit for controlling the switch in accordance with the charge current, wherein the switch is provided in a path shared by the charge current an a discharge current and includes a power feed status detection unit for detecting a normal supply voltage of the external power supply source, an absence of a supply of a voltage from the external power supply source, and a drop in a voltage supplied by the external power supply source, and the charge control unit controls charging of the electric battery by controlling the switch while the power feed status detection unit detects the normal supply voltage of the external power supply source, closes the switch when the power feed status detection unit detects an absence of a supply of a voltage from the external power supply source or a drop in a voltage supplied by the external power supply source, so as to form a discharge path connecting the electric battery and a load, thus supplying power from the electric battery to the load via the switch.

The power supply unit of the present invention is of a relatively low cost and ensures that necessary components are mounted in a smaller space than the conventional power supply unit, by reducing the number of high-cost butt diodes to one and/or by reducing the number of current sense resistors to one. Further, the present invention ensures that a voltage drop due to the butt diodes and a power consumption by the current sense resistors in a wasteful manner are reduced so that the efficiency of the power supply unit is improved.

BRIEF DESCRIPTION OF THE DRAWINGS

Other objects and further features of the present invention will be apparent from the following detailed description when read in conjunction with the accompanying drawings, in which:

FIG. 9 shows the power supply unit according to a second embodiment of the present invention;

DESCRIPTION OF THE PREFERRED EMBODIMENTS

Figure 5:
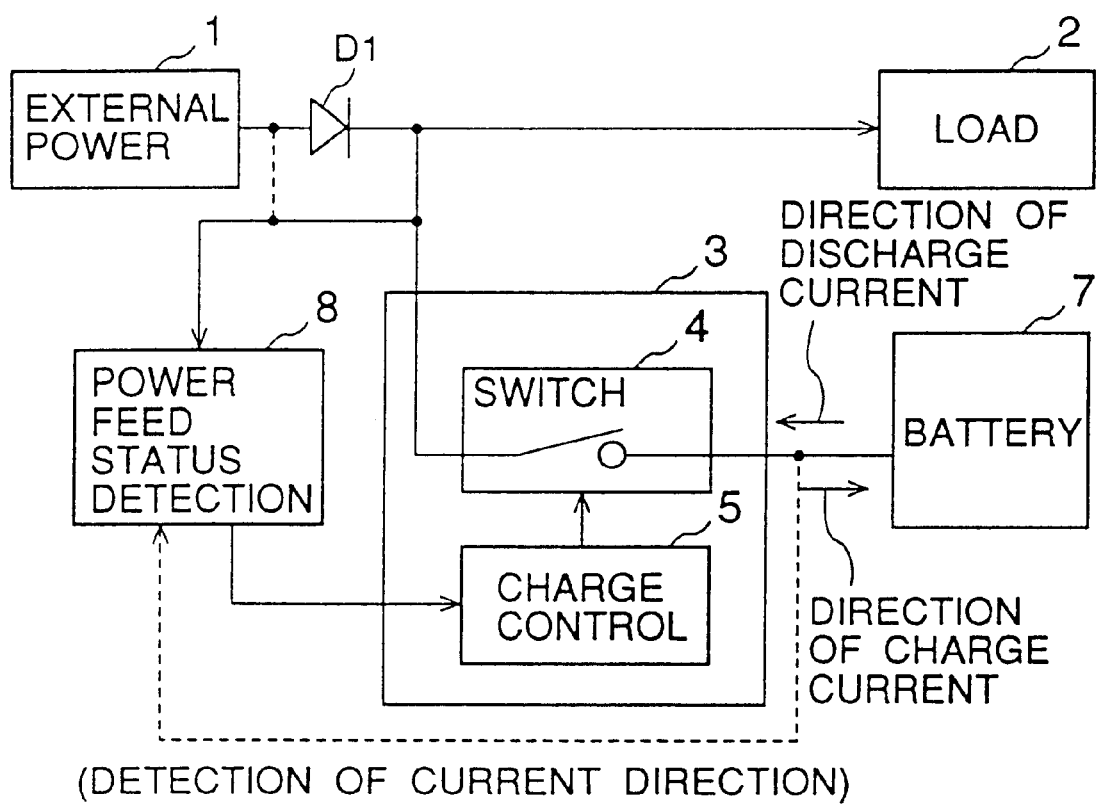
FIG. 5 shows a first basic construction of a power supply unit in which the number of butt diodes is reduced.

FIG. 5 shows a first basic construction of a power supply unit in which the number of butt diodes is reduced.

Referring to FIG. 5, the power supply unit comprises an external power supply source 1, a charger unit 3, an electric battery 7, a power feed status detection unit 8 and a butt diode D1. The charger unit 3 charging the electric battery 7 comprises a switch unit 4 and a charge control unit 5. The charge control unit 5 controls the charging of the electric battery 7. The power feed status detection unit 8 detects a power failure of the external power supply source 1. The butt diode D1 prevents the power supplied by the electric battery 7 from being drained to the external power supply source 1 while the electric battery 7 is in use.

While the power feed status detection unit 8 of FIG. 5 is configured to detect the voltage at the cathode of the butt diode D1. The power feed status detection unit 8 may also be configured to detect the anode voltage. Alternatively the power feed status detection unit 8 may be configured to detect a power failure by detecting the direction of the current flowing in the electric battery 7.

A description will now be given of the operation of the power supply unit of FIG. 5.

While the external power supply source 1 is in use, the power is supplied from the external power supply source 1 to a load 2 via the butt diode D1. The power supplied from the external power supply source 1 is also fed to the electric battery 7 via the switch unit 4 of the charger unit 3. The power feed status detection unit 8 detects whether or not there is a power failure of the external power supply source 1 and notifies the charge control unit 5 accordingly. When no power failure is detected in the external power supply source 1 by, for example, determining that a voltage exceeding the voltage of the electric battery is supplied, the associated signal is sent from the power feed status detection unit 8 to the charge control unit 5. In this case, the charge control unit 5 controls the switch unit 4 so as to effect constant-voltage/constant-current control the charging of the electric battery 7 implemented, for example, by a lithium ion battery.

When there is a failure of the external power supply source 1, the power feed status detection unit 8 generates a signal indicating the power failure of the external power supply source 1 and sends the same to the charge control unit 5. Upon receipt of the same signal, the charge control unit 5 turns the switch unit 4 ON, thus causing the power of the electric battery 7 to be supplied to the load 2 via the switch unit 4.

According to the power supply unit described above, only the diode D1 for preventing the power of the electric battery 7 from being drained to the external power supply source 1 is required.

Figure 6:
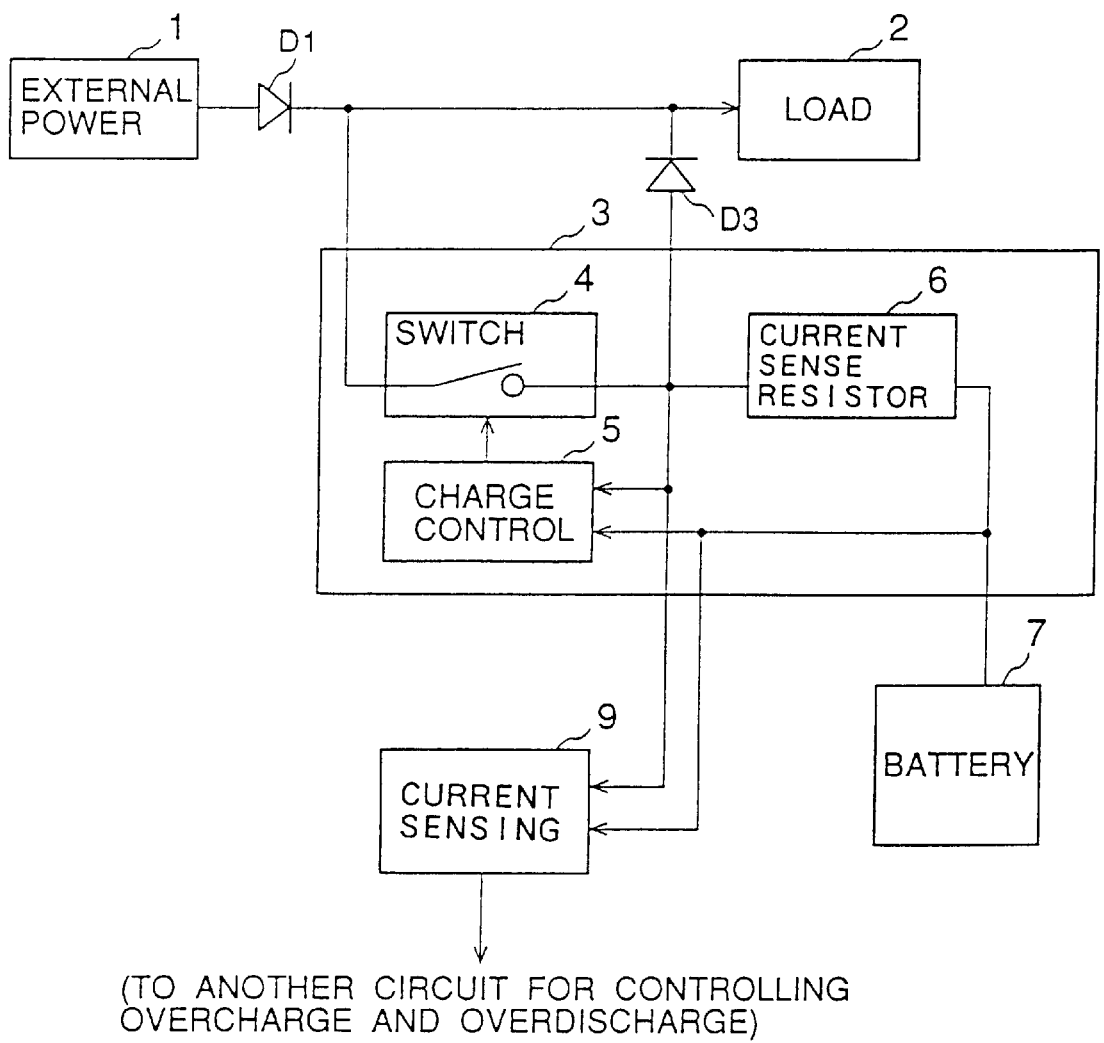
FIG. 6 shows a second basic construction of the power supply unit in which a current sense unit is coupled to a charger unit and the number of current sense resistors is reduced.

FIG. 6 shows a second basic construction of the power supply unit in which a current sense unit is coupled to the charger unit and the number of current sense resistors is reduced.

Referring to FIG. 6, the power supply unit comprises the external power supply source 1, the charger unit 3, the electric battery 7 and the current sense unit 9. The charger unit 3 includes the switch unit 4, the charge control unit 5 and the current sense resistor 6. The current sense resistor 6 detects the charge current and the discharge current of the electric battery 7. The current sense unit 9 detects the discharge current of the electric battery 7 and notifies another circuit (for example, a circuit for discharge control of the electric battery 7) of the detected level of the discharge current, the other circuit being not shown.

A description will now be given of an operation of the power supply unit of FIG. 6.

While the external power supply source is in use, the power of the external power supply source is supplied to the load 2 via the diode D1. The power of the external power supply source is also supplied to the electric battery 7 via the switch unit 4 and the current sense resistor 6. The charge control unit 5 controls the charging of the electric battery 7 by turning ON and OFF the switch unit 4 in accordance with a voltage occurring across the current sense resistor 6 due to the charge current. The current sense unit 9 detects the current value by detecting the voltage across the current sense resistor 6. The current sense unit 9 sends the detected voltage level to another circuit (not shown) for controlling overcharge etc. In the event of an overcharge, the charge control unit 5 stops charging the electric battery 7.

When there is a power failure of the external power supply source 1, the cathode voltage of the diode D3 drops so that a current flows from the electric battery 7 to the load 2 via the current sense resistor 6 and the diode D3. The current sense unit 9 determines the level of the voltage developed across the current sense resistor 6 due to the load current and notifies the other circuit for controlling the overdischarge of the determined voltage level. Any overdischarge occurring due to the load current is prevented by the other circuit.

According to the construction of FIG. 6, it is necessary to provide only one resistor in order to detect the charge current and the discharge current. Accordingly, the number of current sense resistors is reduced.

Figure 7:
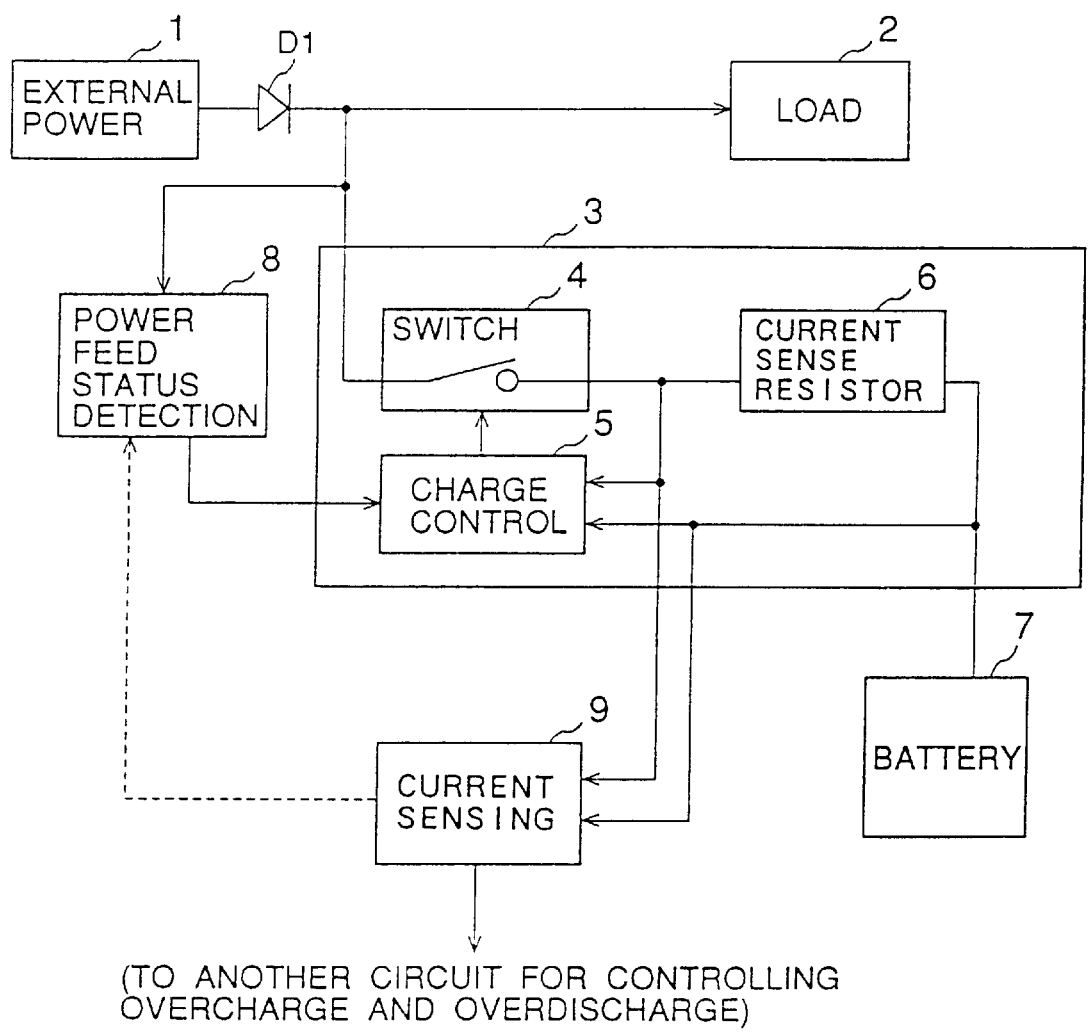
FIG. 7 shows a combination of the first basic construction and the second basic construction.

FIG. 7 shows a combination of the first basic construction and the second basic construction. According to the construction of FIG. 7, only the diode D1 is provided instead of a plurality of butt diodes in the conventional construction. Moreover, only one current sense resistor is required.

The power unit of FIG. 7 comprises the external power supply source 1, the charger unit 3, the electric battery 7, the power feed status detection unit 8 and the current sense unit 9. The charger unit 3 comprises the switch unit 4, the charge control unit 5 and the current sense resistor 6. The current sense resistor 6 detects the charge current and the discharge current of the electric battery 7. While the power feed status detection unit 8 is shown in FIG. 7 to detect the cathode voltage of the butt diode, the power feed status detection unit may detect the anode voltage. Alternatively, the power feed status detection unit 8 may detect a power failure depending on the direction of the current flowing in the current sense resistor.

The current sense unit 9 detects the discharge current and the charge current of the electric battery 7 so as to drive another circuit (not shown) provided for control of the discharging of the electric battery 7 and also for detection and control of overcharge. Since the direction of the load current flowing in the current sense resistor 6 differs form that of the charge current, the current sense unit 9 may be configured to detect the direction of the current.

A description will now be given of the operation of the power supply unit of FIG. 7.

While the external power supply source is in use, the power of the external power supply source 1 is supplied to the load 2 via the diode D1. The power of the external power supply source 1 is also fed to the electric battery 7 via the switch unit 4 and the current sense resistor 6. Upon detecting that the normal voltage is supplied by the external power supply source 1, the power feed status detection unit 8 generates an associated signal and outputs the same to the charge control unit 5. Upon receipt of that signal, the charge control unit 5 generates a voltage for turning the switch unit 4 ON or OFF depending on the voltage generated by the charge current in the current sense resistor 6. In this way, the charging of the electric battery 7 is controlled.

Upon detecting a power failure of the external power supply source 1, the power feed status detection unit 8 generates a signal indicating the detection of the failure and supplies the same signal to the charge control unit 5. Upon receipt of that signal, the charge control unit 5 generates a signal for causing the switch unit 4 to be maintained ON. As a result, the power from the electric battery 7 is supplied to the load 2 via the current sense resistor 6 and the switch unit 4. The current sense unit 9 detects the discharge current of the electric battery 7 by detecting the voltage developed across the current sense resistor 6 due to the discharge current. The current sense unit 9 notifies the other circuit (not shown), controlling the discharge current, of the detected level of the discharge current.

Referring to the FIG. 7, if the power switch is turned on while the external power supply source 1 is in failure, or if the external power supply source 1 fails after operating normally for a certain period of time, a current flow in the current sense resistor 6 in the same direction as the discharge current, due to a parasitic diode in the switch unit 4. For this reason, the current sense unit 9 may be constructed to detect the direction of the current and the power feed status detection unit 8 may be constructed to detect a failure of the external power supply source 1 in accordance with the direction of the current sensed by the current sense unit 9.

The switch unit 4 is turned ON when a power failure is detected, so that the current flows from the electric battery 7 to the load 2.

In case the external power supply source 1 becomes available while the electric battery 7 is being used, the charge current flows in the current sense resistor 6 because the voltage of the external power supply 1 source is higher than the voltage of the electric battery 7. Therefore, the power feed status detection unit 8 is capable of determining whether the external power supply source 1 is operating normally according to the direction of the current in the current sense resistor 6.

According to the construction of FIG. 7, only one current sense resistor provides the current sensing needed in the operations. Also, only one butt diode, the diode D1 for preventing the discharge current from flowing from the electric battery 7 to the external power supply source 1, is required in the power supply unit.

Figure 8:
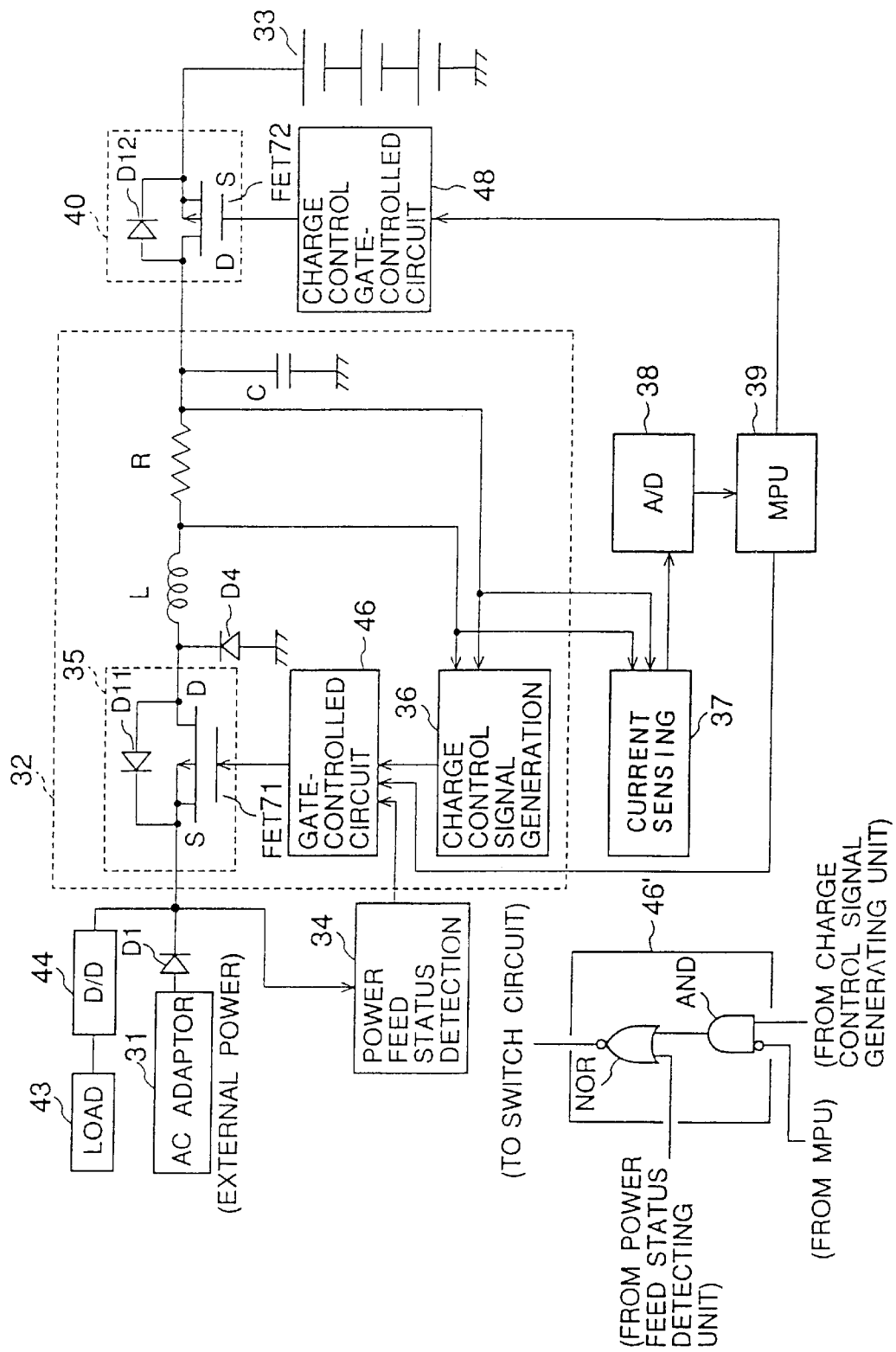
FIG. 8 is a diagram showing a power supply unit according to a first embodiment of the present invention.

FIG. 8 is a diagram showing the power supply unit according to a first embodiment of the present invention.

The power supply unit of FIG. 8 comprises an AC adaptor 31 (which corresponds to the external power supply source 1 of FIGS. 5 and 6), a charger 32 (which corresponds to the charger unit 3), an electric battery 33 (which corresponds to the electric battery 7), a power feed status detection unit 34, a current sense unit 37, an A/D converter, a microprocessor 39, a D/D converter 44, a discharge control switch circuit 40 and a charge control gate-controlled circuit 48.

The charger 32 comprises a switch circuit 35, a charge control signal generation unit 36, a gate-controlled circuit 46, a flyback circuit formed of a coil L, a capacitor C, a resistor R and a diode D4, wherein the resistor R is a current sense resistor for detecting the charge current and the discharge current.

The switch circuit 35 is formed of an FET 71. A diode D11 is a parasitic diode of the FET 71.

Given that the switch circuit 35 is formed of a pFET, the power feed status detection unit 34 outputs a logical low signal (hereinafter, referred to as an L signal) while the AC adaptor 31 outputs a normal voltage (a voltage higher than the voltage of the electric battery). When the AC adaptor fails, the power feed status detection unit 34 outputs a logical high signal (hereinafter, simply referred to as an H signal).

Figure 1:
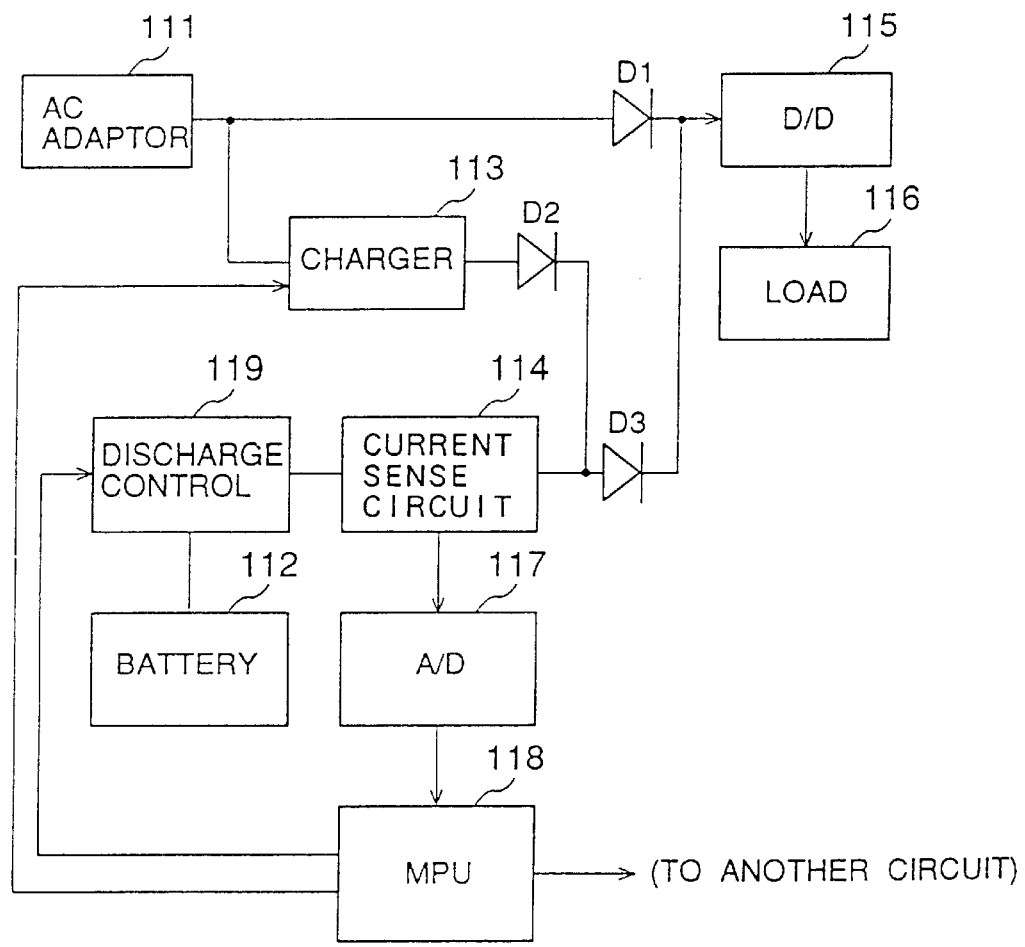
FIG. 1 shows a construction of a conventional power supply unit.
Figure 2:
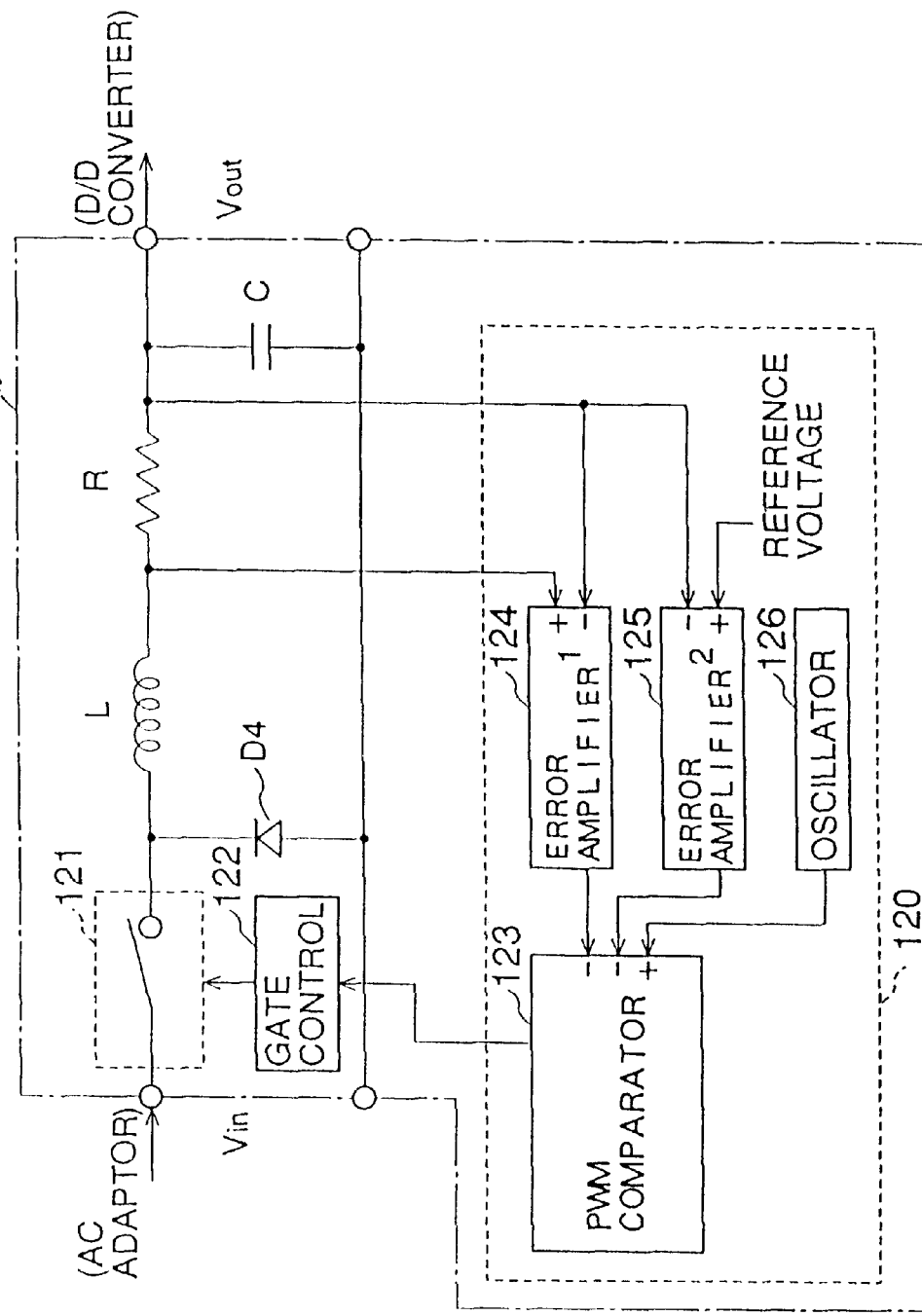
FIG. 2 shows a construction of a conventional charger.
Figures 3A, 3B, 3C:
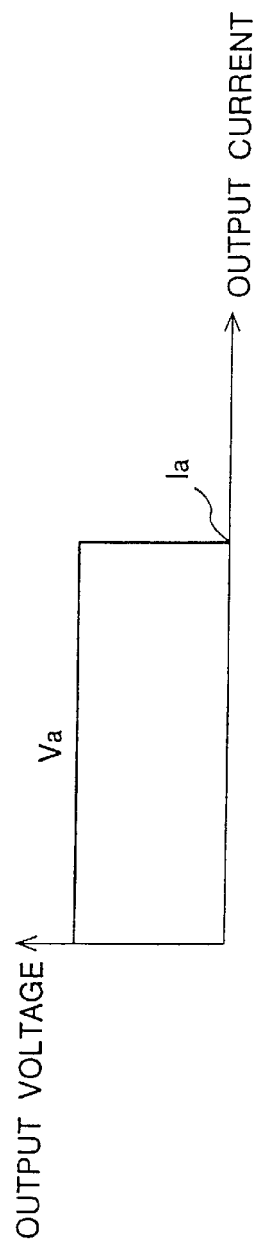
FIGS. 3A and 3B show relationships between inputs of a comparator and an output thereof, inputs of the comparator being voltages supplied by amplifiers, and an oscillator.
FIG. 3C shows the relationship between the output current and the output voltage of the charger.

The charge control signal generation unit 36 may have the same construction as the charge control signal generation unit 120 of FIG. 2 if the electric battery 33 is charged under constant-voltage/constant-current control. In the case of a lithium battery, the constant-voltage/constant-current control is performed. However, in the case of a NiMH battery or a NiCd battery, constant-current control is performed.

Figure 4A:
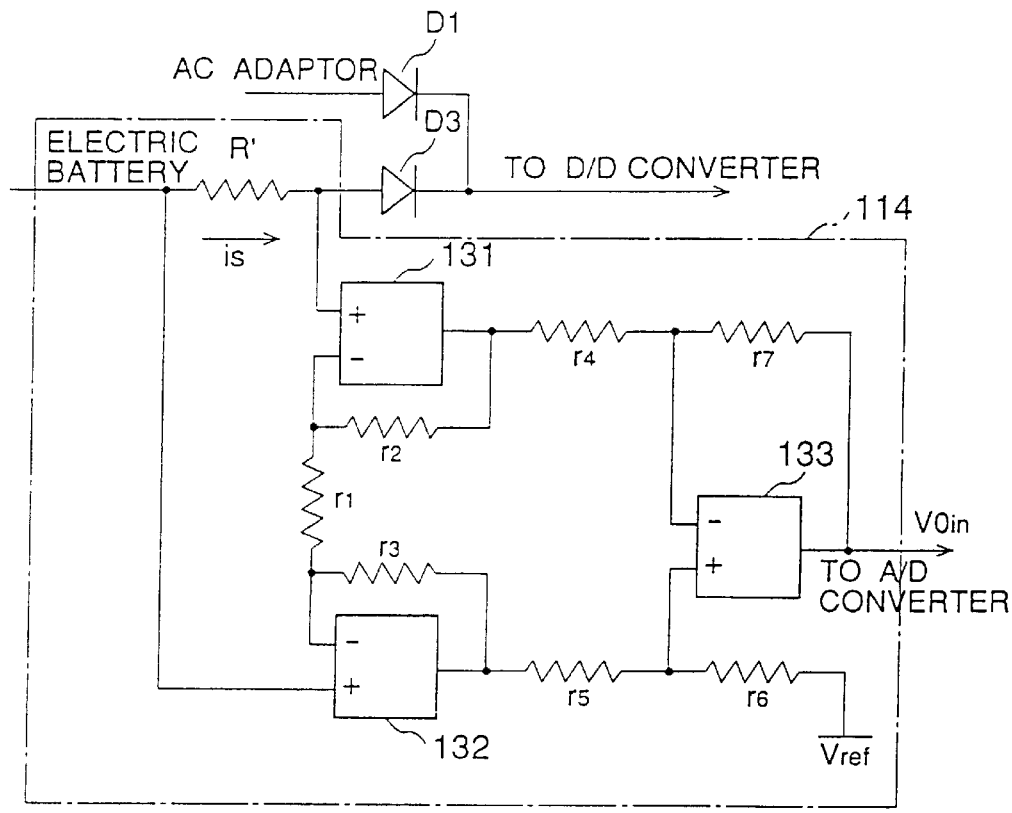
FIG. 4A shows a construction of a conventional current sense circuit.

The current sense unit 37 may have the same construction as the current sense circuit 114 of FIG. 4A.

The A/D converter 38 converts the analog current level detected by the current sense unit 37 into a digital value.

The microprocessor 39 detects overcharge and overdischarge based on the digital value obtained by the A/D converter 38 so as to control the gate-controlled circuit 46 and the discharge control gate-controlled circuit 48.

A discharge control switch circuit 40 coupled to the electric battery 33 is formed of an FET 72. A diode D12 is a parasitic diode of the FET 72.

The gate-controlled circuit 46 turns the FET 71 ON and OFF while the electric battery 33 is being charged. The gate-controlled circuit 46 maintains the FET 71 ON while the electric battery 33 discharges power. That part of the charger 32 constructed by the gate-controlled circuit 46 and the discharge control signal generation unit 36 corresponds to the charge control unit 5 of FIGS. 5 and 6.

FIG. 8 also includes an illustration of an exemplary gate-controlled circuit 46' formed of a NOR circuit and an AND circuit and adapted for a case where the FET 71 is implemented by a pFET.

The discharge control gate-controlled circuit 48 receives an overcharge detection signal provided by the MPU 39.

A description will now be given of the operation of the power supply unit of FIG. 8 assuming that the electric battery 33 is implemented by a lithium ion battery.

While the AC adaptor 31 is being used, the power from the AC adaptor 31 is fed to the input of the D/D converter 44 via the diode D1. The D/D converter 44 converts the power supplied thereto into a voltage adapted for a load 43. The power from the AC adaptor 31 is also fed to the flyback circuit formed of L, R, C and D4 via the switch circuit 35 of the charger 32. The current generated in the charger 32 is used to charge the electric battery 33 via the discharge control switch circuit 40.

Upon detecting the normal output voltage from the AC adaptor 31, the power feed status detection unit 34 generates an associated signal and feeds the same signal to the gate-controlled circuit 46. While the same signal is being input, the gate-controlled circuit 46 turns the FET 71 ON and OFF in accordance with a signal from the charge control signal generation unit 36. Given that the FET 71 is implemented by a pFET and the gate-controlled circuit 46 is formed of a NOR circuit and an AND circuit, the power feed status detection unit 34 outputs the L signal while the AC adaptor 31 outputs the normal voltage. As a result, the switch circuit 35 is turned ON and OFF in accordance with the signal generated by the charge control signal generation unit 36 while the normal power output is maintained by the AC adaptor 31. In this way, the charge current is controlled. The charge control signal generation unit 36 receives a voltage developed across the current sense resistor R and a voltage of the electric battery 33 so as to generate a charge control signal for maintaining constant-voltage/constant-current characteristic of the output of the charger 32. The charge control signal is fed to the gate-controlled circuit 46. In accordance with the charge control signal, the gate-controlled circuit 46 turns the switch circuit 35 ON and OFF so that the charger 32 operates under constant-voltage/constant-current control.

The current sense unit 37 receives an analog voltage developed across the current sense resistor R and sends the associated level of the analog current to the A/D converter 38. The A/D converter 38 converts the analog current level into a digital value and sends the same to the MPU 39. Given that the FET 71 of the switch circuit 35 is implemented by a pFET the gate-controlled circuit 46 is implemented by the exemplary circuit 46', the MPU 39 outputs the H signal upon detecting an overcharge. Since the H signal is negated and input to the AND circuit, the charge control signal from the charge control signal generation unit 36 is blocked so that the NOR circuit maintains the H signal. As a result, the FET 71 is turned OFF so that the charger 32 stops charting the electric battery 33.

A description will now be given of the operation in which the electric battery 33 supplies power to the load 43.

Upon detecting a power failure of the AC adaptor 31, the power feed status detection unit 34 generates a signal indicating the failure. For example, given that the FET 71 is implemented by a pFET and the gate-controlled circuit 46 is implemented by the exemplary circuit 46', the power feed status detection unit 34 outputs the H signal in the event of the power failure. As a result, the gate-controlled circuit 46 maintains the output of the L signal so that the FET 71 of the switch circuit 35 is maintained ON. While no overcharge is detected, the FET 72 is turned on so that the electric battery 33 supplies power to the load 43 via the FET 72, the current sense resistor R, the coil L, the FET 71 and the D/D converter 44. The current sense unit 37 detects the load current provided by the electric battery 33 by detecting a voltage across the current sense resistor R. The analog current level detected by the current sense unit 37 is sent to the A/D converter 38 for converting the analog current level into a digital value to be fed to the MPU 39. The MPU 39 determines whether or not an overcharge has occurred based on the digital value input thereto. If it is determined that an overcharge has occurred, the MPU 39 outputs a signal for turning the FET 72 OFF to the discharge control gate-controlled circuit 48.

While it is assumed in the above description that the FET 71 is implemented by a pFET, the FET 71 may be a nFET. In such a case, the gate-controlled circuit 46 is formed of an OR circuit and an AND circuit in order to provide the same operation as described above in cooperation with the nFET.

FIG. 9 shows the power supply unit according to a second embodiment of the present invention;

In the power supply unit of FIG. 9, an FET 73 is provided between the D/D converter 44 and the end of the resistor R coupled to the coil L in order to eliminate an unfavorable effect caused by a transient voltage occurring in the coil L of the flyback circuit when the electric battery 33 starts supplying power to the load 43.

In FIG. 9, those components that are also found in FIG. 8 are designated by the same reference numerals.

A switch circuit 51 is turned ON when the electric battery 33 supplies power to the load 43 and is turned OFF when the AC adaptor 31 supplies power to the load 43.

A gate-controlled circuit 52 turns the FET 73 ON when the electric battery 33 is discharged, in accordance with the signal output from the power feed status detection unit 34. While the AC adaptor 31 outputs the normal voltage, the gate-controlled circuit 52 turns the FET 73 OFF.

A description will now be given of the operation of the power supply unit of FIG. 9.

While the normal voltage is being supplied by the AC adaptor 31, the power feed status detection unit 34 outputs a signal for turning the FET 73 OFF to the gate-controlled circuit 52. For example, given that the FET 73 is implemented by a pFET, the gate-controlled circuit 52 may be formed of a NOR circuit. In this arrangement, the power feed status detection unit 34 outputs the L signal while the normal voltage is being supplied by the AC adaptor 31. Upon receipt of the L signal, the gate-controlled circuit 52 outputs the H signal so as to turn the FET 73 OFF. As a result, the power from the AC adaptor 31 is supplied to the load 43 via the diode D1 and the D/D converter 44. The charge current for the electric battery 33 flows through the switch circuit 35, the flyback circuit formed of the coil L, the resistor R, the capacitor C and the diode D4. The output voltage of the flyback circuit is fed to the electric battery 33 via the discharge control switch circuit 40. Supplied with the charge current and the output voltage of the charger 32, the charge control signal generation unit 36 generates the charge control signal for maintaining constant-voltage/constant-current control of the charger 32. Similarly to the construction of FIG. 8, the charge control signal fed to the input of the gate-controlled circuit 46 is used to turn the FET 71 of the switch circuit 35 ON and OFF. The current sense unit 37 detects the charge current by detecting the voltage across the current sense resistor R. In the event that the MPU 39 determines that an overcharge has occurred based on the charge current level supplied thereto, the MPU 39 outputs a signal for causing the FET 71 of the switch circuit 35 to be turned OFF to the gate-controlled circuit 46. In this way, the overcharge control similar to that of the construction of FIG. 8 is effected.

Upon detection of a power failure of the AC adaptor 31, the power feed status detection unit 34 supplies a signal for causing the FET 73 to be turned ON to the gate-controlled circuit 52. For example, given that the FET 73 is implemented by a pFET and the gate-controlled circuit 52 is implemented by a NOR circuit, the power feed status detection unit 34 generates the H signal. The gate-controlled circuit 52 receiving the H signal outputs the L signal so as to turn the FET 73 ON. Accordingly, the power of the electric battery 33 is supplied to the load 43 via the discharge control switch circuit 40, the resistor R, the switch circuit 51 and the D/D converter 44. The current sense unit 37 detects the discharge current by receiving a voltage across the current sense resistor R. In the event that the MPU 39 determines that an overdischarge has occurred based on the discharge current level detected by the current sense unit 37, the MPU 39 outputs a signal for causing the FET 72 to be turned OFF to the discharge control gate-controlled circuit 48, similarly to the construction of FIG. 8.

Figure 10A:
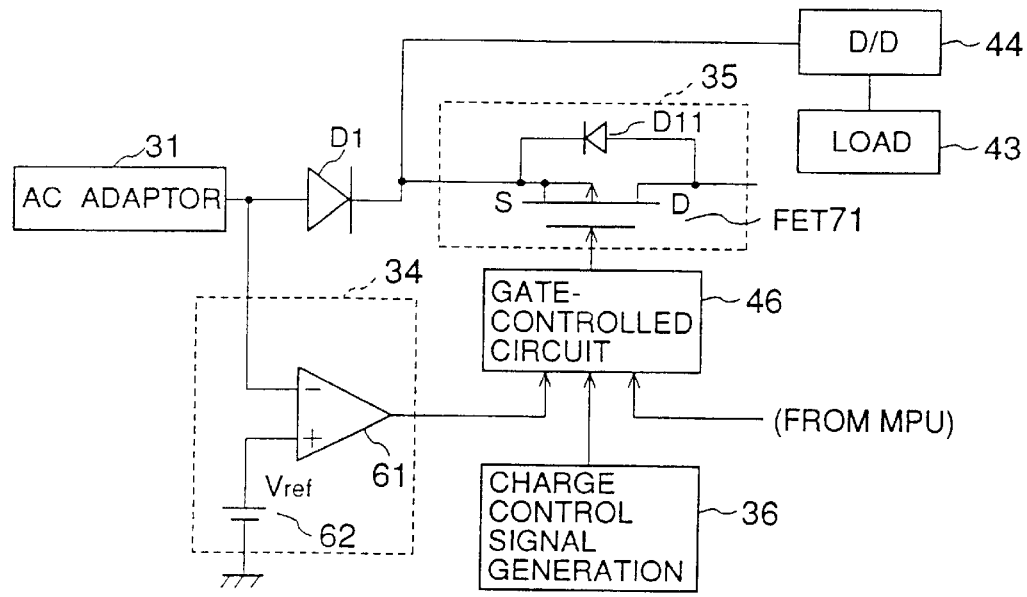
FIGS. 10A and 10B show the power feed status detection units according to the present invention.
Figure 10B:
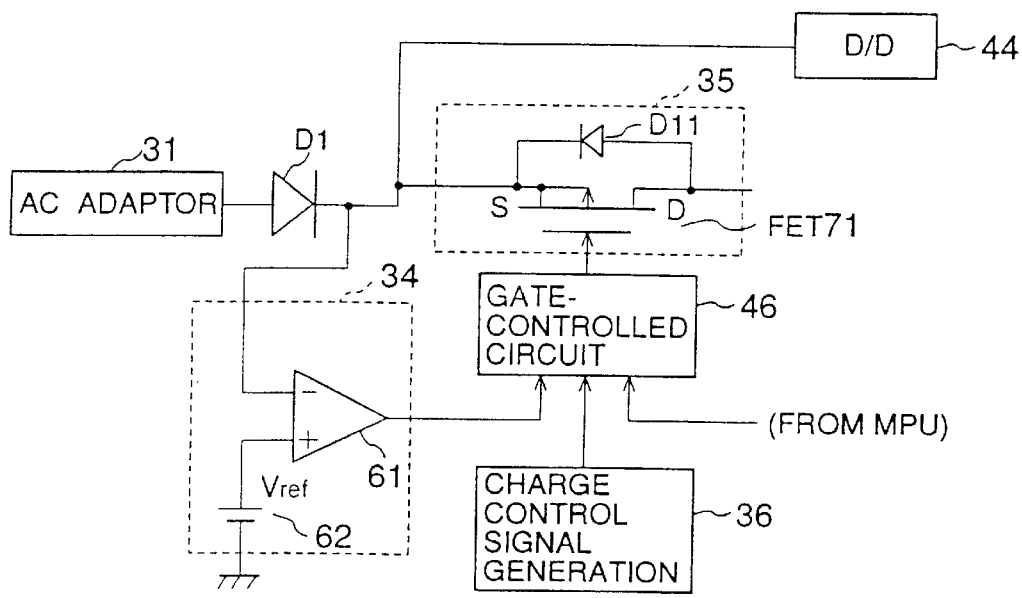

FIGS. 10A and 10B show the power feed status detection units according to the present invention.

FIG. 10A shows the power feed status detection unit of a first type in which the power feed status detection unit 34 is fed with the AC adaptor 31 voltage at the anode of the butt diode D1.

In FIG. 10A, those components that are the same as the components of FIG. 8 are designated by the same reference numerals.

Referring to FIG. 10A, a comparator 61 compares a voltage of the AC adaptor 31 with a reference voltage Vref supplied by a reference voltage source 62 so as to generate a signal for causing the gate-controlled circuit 46 to control the FET 71. The reference voltage Vref is set such that the comparator 61 outputs the H signal when a power failure has occurred in the AC adaptor 31, and the comparator 61 outputs the L signal while the AC adaptor 31 outputs the normal voltage.

A description will now be given of the operation of the construction of FIG. 10A. The comparator 61 receives the anode voltage of the butt diode D1 and compares it with the reference voltage Vref. While the AC adaptor 31 outputs the normal voltage, the comparator outputs the L signal. When a power failure of the AC adaptor 31 occurs, the comparator 61 outputs the H signal.

Given that the FET 71 is implemented by a pFET, the gate-controlled circuit 46 may have the same construction as the exemplary circuit 46' (see FIG. 8). While the AC adaptor 31 outputs the normal voltage, the comparator 61 outputs the L signal. The FET 71 is turned ON and OFF in accordance with the signal from the charge signal generation unit 36 or the MPU.

When a power failure occurs in the AC adaptor 31, the comparator 61 outputs the H signal. At this time, the gate-controlled circuit 46 outputs the L signal so that the FET 71 is maintained ON, thus transmitting the discharge current of the electric battery.

FIG. 10B shows a construction in which the power feed status detection unit 34 is fed with the AC adaptor 31 voltage at the cathode of the butt diode D1. The other aspects of the construction of FIG. 10B are the same as the corresponding aspects of the construction of FIG. 10A. In the construction of FIG. 10B, the reference voltage Vref must be lower than the normal voltage of the AC adaptor 31 and higher than the voltage of the electric battery.

While the power feed status detection unit 34 supplies its signal to the gate-controlled circuit 46, the power feed status detection unit 34 may also supply its signal to the gate-controlled circuit 52 as shown in FIG. 9.

Figure 11:
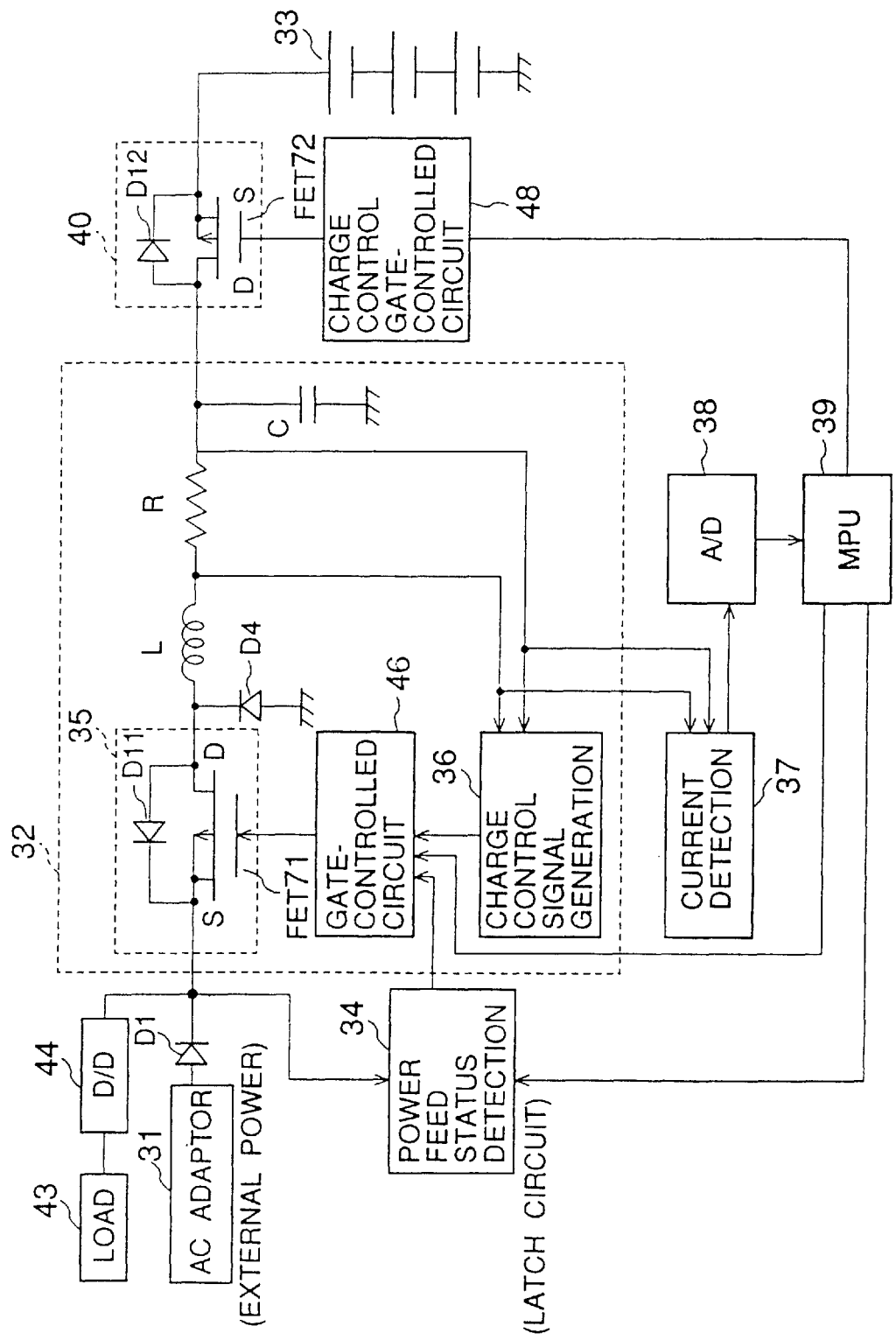
FIG. 11 shows the power supply unit according to a third embodiment of the present invention.

FIG. 11 shows the power supply unit according to a third embodiment of the present invention.

The third embodiment is based on the principle of detecting the status of the power supplied by the AC adaptor 31 by detecting the direction of the current that flows in the current sense resistor R. The current sense unit 37 is configured to provide such a detection by outputting a voltage of a certain level when the charge current flows and a voltage of another level when the discharge current flows.

More specifically, the power supply unit of FIG. 11 is constructed such that a power failure of the AC adaptor 31 and resumption of supplying of the power by the AC adaptor 31 are detected by detecting the direction of the current in the current sense resistor R. In accordance with the detection result, the gate-controlled circuit 46 is controlled as the charge mode is switched to the discharge mode or as the discharge mode is switched to the charge mode.

In FIG. 11, those components that are the same as the components of FIG. 8 are designated by the same reference numerals.

In the construction of FIG. 11, a normal operation in which the AC adaptor supplies power and a normal operation in which the electric battery supplies power by electric discharge are the same as the corresponding operations according to the construction of FIG. 8, and the description thereof is omitted.

Referring to FIG. 11, the power feed status detection circuit 34 is a latch circuit. While the AC adaptor 31 is being used, the power feed status detection circuit 34 outputs a signal that allows the gate-controlled circuit 46 to be controlled in accordance with the signals from the charge control signal generation unit 36 and the MPU 39. While the power is supplied by the electric battery 33, the power feed status detection unit 34 outputs a signal for causing the FET 71 to be maintained OFF to the gate-controlled circuit 46. For example, given that the FET 71 is implemented by a pFET, the gate-controlled circuit 46 may be embodied by the exemplary circuit 46' of FIG. 8. In this case, while the AC adaptor 31 is being used, the power feed status detection unit 34 outputs the L signal. While the electric battery 33 is being used, the power feed status detection unit 34 outputs the H signal.

Figure 4B:
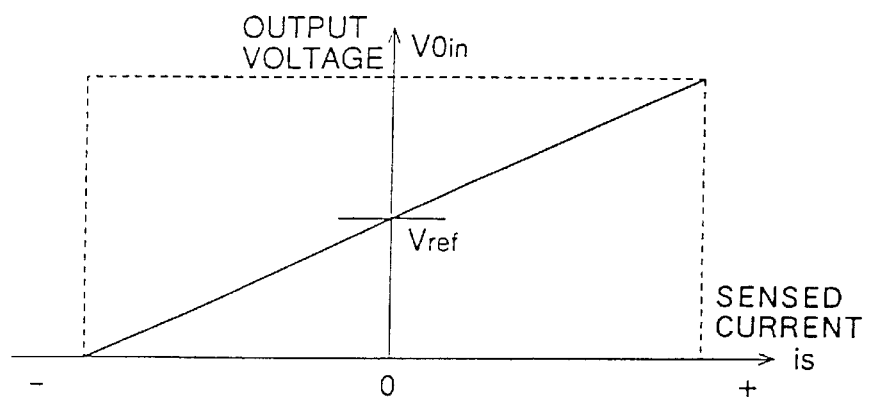
FIG. 4B shows a characteristic of a current flowing in a current sense resistor versus an output voltage of the current sense circuit.

The current sense unit 37 of FIG. 11 is the same as the circuit of FIG. 4A. As shown in FIG. 4B, the current sense unit 37 provides different voltages depending on the direction of the current in the current sense resistor R.

A description will now be given of the operation of the power feed status detection unit 34 of FIG. 11, assuming that the FET 71 is implemented by a pFET.

While the AC adaptor 31 outputs the normal voltage, the power feed status detection unit 34 outputs the L signal.

If the power switch is turned ON in a state in which the AC adaptor 31 is disconnected from a power source, the power feed status detection unit 34 first outputs the L signal. Specifically, the power feed status detection unit 34 is configured to output the L signal whenever the power switch is turned ON. Upon power-on, the charge current flows in the current sense resistor R. The current sense unit 37, capable of outputting voltages depending on the direction of the current in the current sense resistor, then outputs the voltage indicating that the charge current flows. Upon receipt of that voltage, the MPU 39 determines that the charge current flows in the current sense resistor R and maintains L signal output of the power feed status detection unit 34. As a result, the power feed and charging by the AC adaptor 31 is maintained.

It is assumed now that the AC adaptor 31 suffers a failure in the above-described state. Since the voltage of the electric battery 33 is higher than the cathode voltage of the butt diode D1, a current flow from the electric battery 33 to the D/D converter 44 via the FET 72, the current sense resistor R, the coil L, the parasitic diode D11. The current sense unit 37 outputs a voltage corresponding to the direction of the current. The MPU 39 receiving that voltage determines that the discharge current flow in the current sense resistor R and causes the power feed status detection unit 34 to output the H signal. As a result, the FET 71 is maintained ON so that the discharge of the electric battery 33 is maintained.

In case the power switch is turned ON while the AC adaptor 31 is disconnected from a power source, the power feed status detection unit 34 outputs the L signal. However, since the cathode voltage of the diode D1 is not detected, the electric battery 33 supplies a current to the load 43 via the FET 72, the current sense resistor R, the coil L, the parasitic diode D11 and the D/D converter 44. The current sense unit 37 outputs a voltage that corresponds to the direction of the current in the current sense resistor R. The MPU 39 receives the voltage output from the current sense unit 37 and determines that the current in the current sense resistor R is the discharge current and then outputs a signal for causing the power feed status detection unit 34 to output the H signal, thus maintaining the FET 71 ON. In this way, the discharge of the electric battery 33 is maintained.

If the AC adaptor 31 is connected to a power source while the electric battery 33 is discharging, the charge current flows to the electric battery 33 via the current sense resistor R because the output voltage of the AC adaptor 31 is higher than the voltage of the electric battery 33. Accordingly, the current sense unit 37 outputs a voltage that corresponds to the direction of the charge current. Upon receiving the voltage output from the current sense unit 37, the MPU 39 determines that the charge current flows and notifies the power feed status detection unit 34 accordingly so that the power feed status detection unit 34 outputs the L signal. As a result, the charge current is controlled in accordance with the signal output from the charge control signal generation unit 36.

The present invention is not limited to the above described embodiments, and variations and modifications may be made without departing from the scope of the present invention.

What is claimed is:

1. A power supply unit supplying power from an external power supply unit and a battery to load, comprising:
    a circuit path having a first end thereof connected to a line for connecting said external power supply unit and said load and a second end thereof connected to said battery, a charge current for charging said battery and a discharge current from said battery flowing in said circuit path;
    a charge current sense resistor provided in said circuit path;
    a current sense unit detecting a current in said battery by detecting a current in said charge current sense resistor;
    a switch, in which the charge current and the discharge current flow, provided in said circuit path selectively connecting and disconnecting said external power supply unit to and from said battery, respectively;
    a power feed status detection unit detecting a normal supply voltage of said external power supply unit and a drop in a voltage supplied by said external power supply unit; and
    a charge control unit controlling charging of the electric battery by controlling said switch while said power feed status detection unit detects the normal supply voltage of said external power supply unit, and closing said switch when said power feed status detection unit detects a drop in a voltage supplied by said external power supply unit, so as to form a discharge path connecting said battery and said load and thus supplying power from said battery to said load via said switch.

2. The power supply unit as claimed in claim 1, wherein said power feed status detection unit detects a normal supply voltage of the external power supply unit, an absence of a supply of a voltage from the external power supply unit, and a drop in a voltage supplied by the external power supply unit, by detecting a voltage supplied by the external power supply unit.

3. The power supply unit as claimed in claim 1, wherein
said charge control unit controlling charging of said battery by detecting a current in said charge current sense resistor.

4. The power supply unit as claimed in claim 3, wherein said current sense unit provides different outputs depending on a direction of a current in said current sense resistor; and
said power feed status detection unit detects a normal supply voltage of the external power supply unit, an absence of a supply of a voltage from the external power supply unit, and a drop in a voltage supplied by the external power supply unit, by detecting an output from said current sense unit.

5. A power supply unit supplying power from an external power supply unit and a battery to a load, comprising:
a circuit path having a first end thereof connected to a line connecting said external power unit and said load and a second end thereof connected to said battery, a charge current for charging said battery and a discharge current from said battery flowing in said circuit path;
a charge current sense resistor provided in said circuit path;
a charge control circuit controlling charging of said battery, based on the discharge current that flows in said charge current sense resistor;
a current sense unit provided in said circuit path and detecting the discharge current in said battery by detecting the discharge current that flows in said current sense resistor; and
a switch, in which the charge current and the discharge current flow, provided in said circuit path selectively connecting and disconnecting said external power supply unit to and from said battery respectively.

* * * * *